United States Patent

Zierer et al.

Patent Number: 5,741,586
Date of Patent: Apr. 21, 1998

[54] MODIFIED POLYESTERS, PREPARATION THEREOF AND USE THEREOF

[75] Inventors: Dirk Zierer, Hofheim; Peter Klein, Wiesbaden, both of Germany

[73] Assignee: Hoechst Trevira GmbH & Co. KG, Frankfurt am Main, Germany

[21] Appl. No.: 831,527

[22] Filed: Apr. 1, 1997

[30] Foreign Application Priority Data

Apr. 2, 1996 [DE] Germany ............... 196 13 187.1

[51] Int. Cl.$^6$ .................... D02G 3/00; C08G 63/18
[52] U.S. Cl. ............... 428/364; 528/272; 528/298; 528/300; 528/302; 528/307; 528/308; 528/308.6; 428/364
[58] Field of Search ............... 528/272, 298, 528/300, 302, 307, 308, 308.6; 428/364

[56] References Cited

PUBLICATIONS

Ballauff, M., *Makromol. Chem., Rapid Commun.* 7:407–414 (1986).
Ballauff, M., *Mol. Cryst. Liq. Cryst.* 147:163–177 (1987).
Ringsdorf, H., et al, *Makromol. Chem.* 188:1431–1445 (1987).
Ballauff, M., *Angewandte Chemie* 101:261–276 (1989).
Damman, S. B., et al, *Polymer* 34:1891–1897 (1993).

*Primary Examiner*—Samuel A. Acquah
*Attorney, Agent, or Firm*—Connolly & Hutz

[57] ABSTRACT

Polyesters are disclosed containing at least 0.1 mol % of the structural repeat units of the formula I and optionally up to 99.9 mol % of the structural repeat units of the formula II $$-O-OC-Ar^1-CO-O-R^1- \quad (I)$$

$$-O-OC-Ar^2-CO-O-R^2- \quad (II)$$

where
$Ar^1$ is a radical of the formula III and/or of the formula IV and/or of the formula V (III) a benzene ring with substituent $(Y-R^4)_y$ (IV) a naphthalene ring with substituent $(Y-R^4)_y$ (V) two benzene rings linked by Z, with substituents $(R^4-Y)_y$ and $(Y-R^4)_y$ $Ar^2$ is a bivalent mono- or polycyclic aromatic radical which differs from the radicals of the formulae III, IV and V, $R^1$ and $R^2$ are independently of each other a bivalent cycloaliphatic radical derived from cyclohexanedimethanol, a radical of the formula $-_nH_{2n}-$ and/or a radical of the formula $-[C_mH_{2m}-O-]_x-C_mH_{2m}-$, where n is an integer between 2 and 10,
m is an integer between 2 and 10, and
x is an integer from 1 to 20,
Y is a direct C—C bond, $-NR^3-$, $-S-$ or $-O-$,
Z is a direct C—C bond or a bridging group $-O-$, $-C_qH_{2q}-$, $-S-$, $-CO-$ or $-SO_2-$,
q is an integer from 1 to 10,
$R^3$ is a univalent aliphatic, cycloaliphatic, aromatic or araliphatic radical, preferably methyl,
$R^4$ is a radical of the formula $-C_oH_{2o+1}$ and/or a radical of the formula $$-[C_pH_{2p}-O-]_z-R^5,$$

$R^5$ is a univalent aliphatic, cycloaliphatic, aromatic or araliphatic radical, preferably methyl,
o is an integer from 6 to 30,
p is an integer from 2 to 10,
y is an integer from 1 to 4, and
z is an integer from 1 to 10.

The polyesters are notable for a low viscosity and are advantageous to process into shaped structures.

12 Claims, No Drawings

MODIFIED POLYESTERS, PREPARATION THEREOF AND USE THEREOF

The present invention relates to novel polyesters with improved rheological properties. These polyesters are advantageous to process into shaped articles, especially into fibers, films or injection moldings.

A considerable problem with the processing of polymers into fibers, films or other shaped articles is the degradative reduction in the molecular weight, especially high molecular weights, due to shearing in the extruder. To counteract this degradation, various slip agents are added during extrusion. A typical slip agent is ethylene glycol bisstearate. This is a defined ester of stearic acid, which, however, enters transesterification reactions with polyester, such as polyethylene terephthalate (PET), at the high processing temperatures thereof. Such reactions are generally undesirable, since they change the molecular weight distribution of the polymer and thus the rheology of the melt during processing. At the necessary high processing temperatures, furthermore, polyester is always subject to a process of thermal degradation, which can lead to discoloration of the resulting shaped articles and also to an uncontrolled change in the rheology of the melt.

The attaching of aliphatic groups to the main chain of liquid-crystalline, wholly aromatic polyesters has already been described. The intention was to improve the solubility of these compounds, which are generally insoluble in organic solvents, in order that they may be processed at all. The side chains are said to act as 'bonded solvent'. Examples of such wholly aromatic modified polyesters can be found in a number of references, such as Makromol. Chem., Rapid Commun., 7(1986), 407–14; Mol. Cryst. Liq. Cryst., 147(1987), 163–77; Angew. Chemie, 101(1989), 261–76, Makromol. Chem, 188(1987), 1431–45 and Polymer, 34(1993), 1891–97.

It has now been found that the incorporation of specific slip agents into the backbone of polyesters derived from aromatic and aliphatic or cycloaliphatic components brings about a considerable reduction in the viscosity of the polymer melt for the same molecular weight or makes it possible to achieve a manageable melt viscosity at a distinctly higher molecular weight. Polyesters which have been modified in this way can be extruded at appreciably lower temperatures than equivalent unmodified polyesters. This makes it possible to reduce thermal damage to the polymer melt to an appreciable extent without any significant change in the mechanical properties of the shaped article compared with the unmodified polyester.

The present invention accordingly provides polyesters comprising at least 0.1 mol % of the structural repeat units of the formula I and optionally up to 99.9 mol % of the structural repeat units of the formula II

  (I),

  (II), where

Ar$^1$ is a radical of the formula III and/or of the formula IV and/or of the formula V

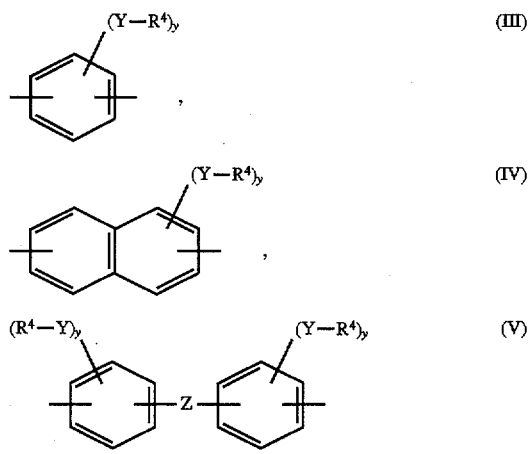

Ar$^2$ is a bivalent mono- or polycyclic aromatic radical which differs from the radicals of the formulae III, IV and V, R$^1$ and R$^2$ are independently of each other a bivalent cycloaliphatic radical derived from cyclohexanedimethanol, a radical of the formula —C$_n$H$_{2n}$— and/or a radical of the formula —[C$_m$H$_{2m}$—O—]$_x$—C$_m$H$_{2m}$—, where n is an integer between 2 and 10, m is an integer between 2 and 10, and x is an integer from 1 to 20, Y is a direct C—C bond, —NR$^3$—, —S— or —O—, Z is a direct C—C bond or a bridging group —O—, —C$_q$H$_{2q}$—, —S—, —CO— or —SO$_2$—, q is an integer from 1 to 10, R$^3$ is a univalent aliphatic, cycloaliphatic, aromatic or araliphatic radical, preferably methyl, R$^4$ is a radical of the formula —C$_o$H$_{2o+1}$ and/or a radical of the formula

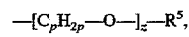

R$^5$ is a univalent aliphatic, cycloaliphatic, aromatic or araliphatic radical, preferably methyl, o is an integer from 6 to 30, p is an integer from 2 to 10, y is an integer from 1 to 4, and z is an integer from 1 to 10.

Any bivalent aromatic radicals in the above-defined formulae are bivalent aromatic radicals whose valence bonds are disposed para or comparably coaxial or parallel to each other or whose valence bonds are disposed meta or comparably angled to each other. A small proportion of aromatic radicals having valence bonds in an angled arrangement may also have valence bonds disposed ortho or comparably angled.

The uni- or bivalent aromatic radicals are generally mono- or polycyclic aromatic hydrocarbon radicals or heterocyclic aromatic radicals which can be monocyclic or polycyclic. Heterocyclic aromatic radicals have in particular one or two oxygen, nitrogen or sulfur atoms in the aromatic nucleus.

Polycyclic aromatic radicals can be fused to one another or be bonded to one another via C—C bonds or via bridging groups, for example —O—, —CH$_2$—, —C(CH$_3$)$_2$—, —S—, —CO— or —SO$_2$—.

Any bivalent aromatic radicals in the above formulae whose valence bonds are disposed para or comparably coaxial or parallel to each other are aromatic radicals having valence bonds which are in coaxial or mutually parallel disposition or which point in opposite directions. An example of coaxial bonds pointing in opposite directions are the biphenyl-4,4'-ene bonds. An example of parallel bonds pointing in opposite directions are the napthalene-1,5 or -2,6 bonds, whereas the napthalene-1,8 bonds are parallel but point in the same direction.

Examples of preferred bivalent aromatic radicals whose valence bonds are disposed para or comparably coaxial or parallel to each other are monocyclic aromatic radicals having free valences disposed para to each other, especially 1,4-phenylene, or bicyclic fused aromatic radicals having parallel bonds pointing in opposite directions, especially 1,4-, 1,5- and 2,6-napthylene, or bicyclic aromatic radicals linked via a C—C bond but having coaxial bonds pointing in opposite directions, especially 4,4'-biphenylene.

Examples of bivalent aromatic radicals whose valence bonds are disposed meta or comparably angled to each other are monocyclic aromatic radicals having mutually meta-disposed free valences, especially 1,3-phenylene, or bicyclic fused aromatic radicals having mutually angled bonds, especially 1,6- and 2,7-naphthylene, or bicyclic aromatic radicals linked via a C—C bond and having mutually angled bonds, especially 3,4'-biphenylene.

Examples of univalent aromatic radicals are mono- or bicyclic aromatic hydrocarbon radicals, especially naphthyl or phenyl.

If a plurality of —Y—R$^4$ radicals are present in the group of the formula IV, they can be situated on either or on both of the aromatic nuclei.

Any univalent araliphatic radicals in the above-defined formulae are chiefly hydrocarbon radicals having a uni- or bivalent aromatic hydrocarbon bound into an alkylene chain. Benzyl is a typical example of such radicals.

Any uni- or bivalent cycloaliphatic radicals in the above-defined formulae are chiefly radicals having at least one saturated hydrocarbon ring having 5 or 6 carbon atoms. Examples thereof are cyclopentyl, cyclohexyl or cyclohexylene. The radicals in question can contain aliphatic moieties as well as cycloaliphatic moieties, and are for example bivalent radicals derived from hydrogenated bisphenol A or from cyclohexanedimethanol.

Any uni- or bivalent aliphatic radicals in the above-defined formulae are chiefly branched or preferably straight-chain alkyl or alkylene radicals. Univalent aliphatic radicals customarily have one to thirty carbon atoms, unless otherwise defined above.

Examples of univalent aliphatic radicals are methyl, ethyl, propyl, butyl, pentyl, hexyl, heptyl, octyl, nonyl, decyl, undecyl, dodecyl, tetradecyl, hexadecyl, octadecyl, eicosyl or behenyl.

The aliphatic bivalent radicals appearing in the polyesters of this invention have 2 to 10 carbon atoms. Z can also be a methylene group. Examples of such radicals are ethylene, 1,3-propanediyl, 1,4-butanediyl, 1,6-hexanediyl, 1,8-octanediyl or 1,10-decanediyl, but also branched radicals, such as propylidene or butylidene. Particular preference is given to 1,4-butanediyl and especially ethylene.

Instead of or alongside alkyl or alkylene groups, the polyesters of this invention can have uni- or bivalent radicals derived from polyalkylene glycols. Typical examples thereof are uni- or bivalent radicals of di-, tri- or tetraethylene glycol or of di-, tri- or tetrapropylene glycol or of di-, tri- or tetrabutylene glycol.

Preferred cylcoaliphatic radicals have six ring carbon atoms. Preferred examples thereof are 1,4-cyclohexanedimethanol or 1,4-cyclohexanediyl.

All these above-recited radicals can be substituted by preferably one to two inert radicals. Examples thereof are alkyl or alkoxy groups or halogen atoms. These include in particular alkyl groups having 1 to 6 carbon atoms, which can be branched or preferably straight-chain, and very particularly preferably methyl or ethyl; or alkoxy groups having 1 to 6 carbon atoms in the alkyl radical, which can be branched or preferably straight-chain, very particular preference being given to methoxy or ethoxy; or chlorine or bromine.

The modified polyesters of this invention customarily have an intrinsic viscosity of at least 0,4 dl/g, preferably 0.5 to 1.5 dl/g. The intrinsic viscosity is measured in a solution of the copolyester in hexafluoroisopropanol/chloroform at 25° C.

The polyesters of this invention can contain up to 100 mol % of the structural repeat unit of the formula I.

Preference is given to copolyesters containing 0.1 to 50 mol % of structural repeat units of the formula I and 99.9 to 50 mol % of structural repeat units of the formula II.

Preference is likewise given to polyesters wherein R$^1$ and R$^2$ are butylene and especially ethylene.

Particular preference is given to polyesters wherein Y is —O—. These are notable for high thermal stability.

Particular preference is likewise given to polyesters wherein y is 2 and/or o is an integer from 12 to 18.

Particularly preferred polyesters include compounds containing the structural repeat unit of the formula I wherein Ar$^1$ is a radical of the formula IIIa

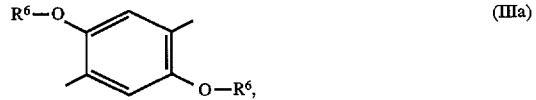

and wherein R$^6$ is C$_{12}$–C$_{18}$-alkyl.

Very particular use is made of polyesters containing 1 to 10 mol % of structural repeat units of the formula I and 99 to 90 mol % of structural repeat units of the formula II where Ar$^1$ is a radical of the formula IIIa as defined above, Ar$^2$ is 1,4-phenylene, 2,6-naphthylene, 4,4-biphenylene and/or 1,3-phenylene, and R$^1$ and R$^2$ are independently of each other butylene or preferably ethylene.

The polyesters of this invention are customarily either used as copolyesters or extruded in mixtures which other polyesters. Under the conditions in the extruder, such mixtures customarily experience a transesterification, so that the end product contains at least a significant proportion of the polymer in the form of a copolymer. If, for example, two homopolyesters, such as PET and a polyester composed of 100 mol % of the structural repeat unit of the formula I, are coextruded, the amounts of the two polyesters should be chosen in such a way that the end product contains a proportion of structural repeat units of the formula I which is within the range between 0.1 to 50 mol %.

Particular preference is given to a polymer composition comprising a polyester A having structural repeat units of the formula I and optionally of the formula II and a polyester B having structural repeat units of the formula II but no structural repeat units of the formula I.

The polyesters of this invention can be prepared by conventional processes. Conventional monomers are used as starting materials.

The invention also provides a process for preparing the above-defined polyester by polycondensing at least 0.1 mol % and optionally up to 99.9 mol %, based on the dicarboxylic acids, of the dicarboxylic acids of the formula VI and optionally of the formula VII

HOOC—Ar$^1$—COOH  (VI),

HOOC—Ar$^2$—COOH  (VII), with at least 0.1 mol % and optionally up to 99.9 mol %, based on the dialcohols, of the dialcohols of the formula VIII and optionally of the formula IX

HO—R$^1$—OH  (VIII),

HO—R$^2$—OH  (IX), where Ar$^1$, Ar$^2$, R$^1$ and R$^2$ are each as defined above, in a conventional manner.

The invention further provides a process for preparing the above-defined polyester by subjecting at least 0.1 mol % and optionally up to 99.9 mol %, based on the dicarboxylic esters, of the dicarboxylic esters of the formula X and optionally of the formula XI

R$^7$OOC—Ar$^1$—COOR$^7$  (X),

R$^7$OOC—Ar$^2$—COOR$^7$  (XI), to a transesterification and subsequent polycondensation with at least 0.1 mol % and optionally up to 99.9 mol %, based on the dialcohols, of the dialcohols of the formula VIII and optionally of the formula IX

HO—R$^1$—OH  (VIII),

HO—r$^2$—OH  (IX), wherein Ar$^1$, Ar$^2$, R$^1$ and R$^2$ are each as defined above and R$^7$ is a univalent aliphatic, cycloaliphatic, aromatic or araliphatic radical, in a conventional manner.

The polycondensation of the polyesters of this invention is generally carried out as a melt polycondensation.

The starting materials used for the polycondensation are, in a conventional manner, polycondensable compounds, such as the corresponding dicarboxylic acid or a corresponding precursor, such as a diester of a dicarboxylic acid, and the corresponding alcohol, which are condensed in the presence of a catalyst to form the polyester. The actual polycondensation can be followed by a solid-phase condensation for the purpose of raising the molecular weight.

The polyesters of this invention do not necessarily need a solid-phase condensation for raising the molecular weight in relation to a number of fields of application, since processing is possible at temperatures which, compared with the unmodified polyester grades, are lower, and thus the thermal reduction in the molecular weight of the polyester during the processing can be limited, or higher molecular weights can be obtained in the course of the condensation owing to the low melt viscosity.

The catalysts used for the polycondensation can be the conventional ones in the known amounts. Examples of polycondensation catalysts are oxides, carboxylates, such as acetates, alkoxides and complexes, such as acetylacetonates, of antimony, cobalt, germanium, titanium or zinc. These catalysts are customarily used in amounts of 3 to 1000 ppm of metal, based on the dicarboxylic acid. Typical polycondensation temperatures vary within the range from 260° to 300° C., preferably between 270° and 290° C.

In a preferred form of performing the polycondensation, the diester of the corresponding dicarboxylic acid is used, preferably the dimethyl ester, and a transesterification is carried out in the presence of one or more dihydric alcohols and thereafter the polycondensation is carried out under reduced pressure. Typical transesterification temperatures vary within the range from 160° to 230° C.

Examples of suitable transesterification catalysts are oxides, carboxylates, such as acetates, alcoholates and complexes, such as acetylacetonates, of manganese, cobalt, zinc, calcium or magnesium. These catalysts are customarily used in amounts of 5 to 500 ppm of metal, based on the dicarboxylic diester.

Of course, it is also possible to use mixtures of different dicarboxylic acids or esters instead of individual dicarboxylic acids or esters; this also holds for the dihydric alcohols, mutatis mutandis. Furthermore, oligomers can be used as compounds for the polycondensation; for example mixtures of bis(hydroxyethyl terephthalate) and higher oligomers.

The molecular weight of the polyester increases in the course of the polycondensation, and hence also the viscosity of the reaction batch.

An adequate molecular chain length has been reached, for example, when the viscosity of the polymer solution obtained in the course of the polycondensation corresponds to a specific viscosity of the polymer of more than 350, preferably 700 to 1400.

Specific viscosity (SV) is the term $$eta_{sp} = (eta_{rel} - 1) * 1000$$

where $eta_{rel}$ is the relative viscosity measured at 25° C. on a solution of 1 g of the polymer in 100 ml of dichloroacetic acid.

The polyester of this invention can be processed, if necessary after adequate drying, into shaped structures, for example into fibers, films, hollow articles, such as bottles, or injection moldings. The formation of the shaped structures can be effected according to conventional shape-conferring processes.

Particular emphasis must be given to the surprisingly low viscosity of the polyesters of this invention, which permit processing at reduced temperatures or facilitate processing of polyesters having a comparatively high molecular weight at "normal" temperatures.

The shaped structures obtained have excellent thermal and mechanical properties and can be industrially utilized in a very wide variety of ways, for example as packaging materials or as industrial yarns, especially as reinforcing yarns for composites, as for tires or for conveyor belts or as V-belts. Here the modification also proves effective in promoting the bond between the reinforcing yarns and the rubber matrix in the manner of a compatibilizer.

The invention also provides for the use of the above-defined polyesters or of the above-defined polyester composition for production of shaped structures, preferably of fibers, films, hollow articles or injection moldings.

The examples which follow elucidate the invention without limiting it.

EXAMPLES

1A) Preparation of polyesters

First, some polyesters were prepared according to a standard recipe in a glass apparatus in the laboratory with a varying comonomer content.

To this end, 1000 g of dimethyl terephthalate (DMT) were transesterified with 600 ml of ethylene glycol (EG) and 330 mg of manganese acetate. After the glycol had been driven off and the PHM ester stabilized, 1.9 mol % (based on the dicarboxylic acid components) of 2,5-di-n-hexadecyloxyterephthalic acid (2,5-DHDT), suspended in a little EG were added together with 390 mg of Sb203. The subsequent polycondensation proceeded in the same way as the polycondensation without the modifier. The desired molecular weight was set via an observation of the torque of the stirrer used in the polycondensation. In this way, two modified polyesters C and D having different molecular weights were prepared.

In two further batches, unmodified polyethylene terephthalates A and B having molecular weights corresponding to polyesters C and D were prepared.

1B) Characterization of thermal properties of polyesters

The polyester products had the following properties measured by means of DSC (heating-up rate: 20K/min; 10 or 8 mg of substance):

| Polyester Type | Modification 2,5-DHDT (wt. %) | Glass transition temperature $T_g$(°C.) | Cold crystallization $T_c$(°C.) | Melting point $T_m$(°C.) |
| --- | --- | --- | --- | --- |
| A | none | 80 | 138 | 257 |
| B | none | 79 | 135 | 256 |
| C | 6.5% | 65 | 126 | 249 |
| D | 6.5% | 66 | 126 | 250 |

1C) Characterization of molecular weights of polyesters

The polyester products had the following molecular weights measured by GPC or solution viscosity:

| Polyester Type | Modification 2,5-DHDT (wt. %) | Specific viscosity[1] | Intrinsic viscosity[2] [dl/g] | $M_w$ [g/mol] | $M_n$ [g/mol] | $M_w/M_n$ |
| --- | --- | --- | --- | --- | --- | --- |
| A | none | 800 | 0.492 | 46000 | 19300 | 2.39 |
| B | none | 779 | 0.484 | 45800 | 19500 | 2.35 |
| C | 6.5% | 800 | 0.530 | 52200 | 21100 | 2.47 |
| D | 6.5% | 771 | 0.510 | 50150 | 20650 | 2.43 |

[1] measured in DCE
[2] measured in HFIP/CHCl₃

It is noteworthy that the GPC- and IV-measured molecular weights of the modified polyesters are higher than those of the unmodified polyesters. This can be explained, on the one hand, by an error having been committed in the couse of the SV measurement owing to the relatively high concentration of the solution (1% by weight). But the GPC measurement too was subject to an error due to the fact that the calibration for PET was not 100% applicable to the copolyesters. Owing to the side chains, the modified polyesters have a larger hydrodynamic volume based on the length of the main chain. This resulted in the evaluation of the GPC eluagram arriving at a molecular weight which was somewhat too high. Similarly, the intrinsic viscosity was affected by the modified Mark-Houwink coefficients. Thus, in reality the molecular weights of the modified polyesters were somewhat lower than reported, but still higher than those of the unmodified PETs.

1D) Characterization of rheological properties of polyester products

The melt viscosity of the polyester products was measured by means of a cone-plate rheometer. To this end, the polyesters were dried and melted at 290° C. The melt viscosity was measured at 260° C. and at different frequencies. The results are shown in the following table:

| Polyester Type | Modification 2,5-DHDT (wt. %) | Viscosity in Pas (at various measurement frequencies) | | | | |
| --- | --- | --- | --- | --- | --- | --- |
| | | 0.1 Hz | 1 Hz | 10 Hz | 100 Hz | 500 Hz |
| A | none | 410 | 410 | 400 | 350 | 250 |
| B | none | 320 | 320 | 300 | 250 | 210 |
| C | 6.5 % | 370 | 370 | 340 | 290 | 205 |
| D | 6.5% | 270 | 270 | 250 | 210 | 160 |

It is noteworthy that the melt viscosity values of the modified polyesters are distinctly below the values of the corresponding unmodified polyesters (types C/A or D/B), although the molecular weights of the modified types were higher than those of the corresponding unmodified types. The zero shear viscosity of the modified types was in both cases about 50 Pas below the corresponding value of the unmodified types.

What is claimed is:

1. A polyester containing at least 0.1 mol % of the structural repeat units of the formula I and optionally up to 99.9 mol % of the structural repeat units of the formula II

(I),

(II), where

Ar¹ is a radical of the formula III and/or of the formula IV and/or of the formula V

(III)

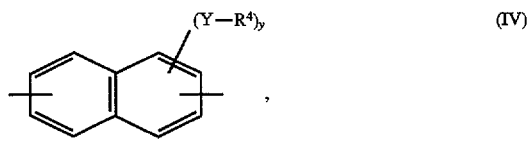

(IV)

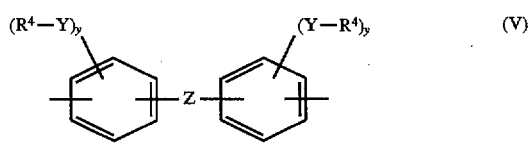

(V)

Ar² is a bivalent mono- or polycyclic aromatic radical which differs from the radicals of the formulae III, IV and V, R¹ and R² are independently of each other a bivalent cycloaliphatic radical derived from cyclohexanedimethanol, a radical of the formula —$C_nH_{2n}$— and/or a radical of the formula —[$C_mH_{2m}$—O—]$_x$—$C_mH_{2m}$—, where n is an integer between 2 and 10, m is an integer between 2 and 10, and x is an integer from 1 to 20, Y is a direct C—C bond, —NR³—, —S— or —O—, Z is a direct C—C bond or a bridging group —O—, —$C_qH_{2q}$—, —S—, —CO— or —SO₂—, q is an integer from 1 to 10, R³ is a univalent aliphatic, cycloaliphatic, aromatic or araliphatic radical, $R^4$ is a radical of the formula $-C_oH_{2o+1}$ and/or a radical of the formula $-[C_pH_{2p}-O-]_z-R^5$, $R^5$ is a univalent aliphatic, cycloaliphatic, aromatic or araliphatic radical, o is an integer from 6 to 30, p is an integer from 2 to 10, y is an integer from 1 to 4, and z is an integer from 1 to 10.

2. The polyester of claim 1, containing 0.1 to 50 mol % of structural repeat units of the formula I and 99.9 to 50 mol % of structural repeat units of the formula II.

3. The polyester of claim 1, wherein $R^1$ and $R^2$ are butylene.

4. The polyester of claim 1, wherein Y is —O—.

5. The polyester of claim 1, wherein y is 2 and o is an integer from 12 to 18.

6. The polyester of claim 1, wherein $Ar^1$ is a radical of the formula IIIa

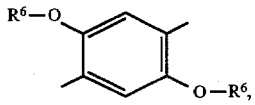
(IIIa)

where $R^6$ is $C_{12}$–$C_{18}$-alkyl.

7. The polyester of claim 6, containing 1 to 10 mol % of structural repeat units of the formula 1 and 99 to 90 mol % of structural repeat units of the formula II where $Ar^1$ is a radical of the formula IIIa, $Ar^2$ is 1,4-phenylene, 2,6-naphthylene, 4,4-biphenylene and/or 1,3-phenylene, and $R^1$ and $R^2$ are independently of each other butylene.

8. A process for preparing the polyester of claim 1, which comprises polycondensing at least 0.1 mol % and optionally up to 99.9 mol %, based on the dicarboxylic acids, of the dicarboxylic acids of the formula VI and optionally of the formula VII

 (VI),

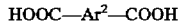 (VII), with at least 0.1 mol % and optionally up to 99.9 mol %, based on the dialcohols, of the dialcohols of the formula VIII and optionally of the formula IX

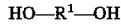 (VIII),

HO—$R^2$—OH (IX), where $Ar^1$, $Ar^2$, $R^1$ and $R^2$ are each as defined in claim 1, in a conventional manner.

9. A process for preparing the polyester of claim 1, which comprises subjecting at least 0.1 mol % and optionally up to 99.9 mol %, based on the dicarboxylic esters, of the dicarboxylic esters of the formula X and optionally of the formula XI

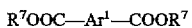 (X),

 (XI), to a transesterification and subsequent polycondensation with at least 0.1 mol % and optionally up to 99.9 mol %, based on the dialcohols, of the dialcohols of the formula VIII and optionally of the formula IX

HO—$R^1$—OH (VIII),

HO—$R^2$—OH (IX), where $Ar^1$, $Ar^2$, $R^1$ and $R^2$ are each as defined in claim 1 and $R^7$ is a univalent aliphatic, cycloaliphatic, aromatic or araliphatic radical, in a conventional manner.

10. A polymer composition comprising a polyester A having structural repeat units of the formula I and optionally of the formula II as set forth in claim 1 and a polyester B having structural repeat units of the formula II but no structural repeat units of the formula I as set forth in claim 1.

11. A method for forming a shaped structure which comprises forming said structure from the polyester as claimed in claim 1.

12. A method for forming a shaped structure which comprises forming said structure from the polymer composition as claimed in claim 10.

* * * * *